United States Patent
Halliday et al.

[15] 3,652,978
[45] Mar. 28, 1972

[54] ECHO-RESPONSIVE APPARATUS

[72] Inventors: William Halliday, London; Roy William George Haslett, Ilford, both of England

[73] Assignee: Smiths Industries Limited, London, England

[22] Filed: Dec. 19, 1969

[21] Appl. No.: 886,664

[30] Foreign Application Priority Data

Dec. 20, 1968 Great Britain .................... 60,652/68

[52] U.S. Cl. .................. 340/3 R, 340/3 PS, 340/6 R, 343/100 SA
[51] Int. Cl. ........................................................ G01s 9/68
[58] Field of Search ............... 340/3, 3 PS, 5, 6, 16; 343/16, 343/100 SA, 5 PC

[56] References Cited

UNITED STATES PATENTS

| | | | |
|---|---|---|---|
| 3,389,372 | 6/1968 | Halliday et al. | 340/3 |
| 3,144,631 | 8/1964 | Lustig et al. | 340/3 |
| 2,972,732 | 2/1961 | Hammond, Jr. | 340/5 |
| 3,039,079 | 6/1962 | Walters et al. | 340/6 |
| 3,072,903 | 1/1963 | Meyer | 343/100 SA |
| 3,202,991 | 8/1965 | Howells | 343/100 SA |

Primary Examiner—Richard A. Farley
Attorney—William D. Hall, Elliott I. Pollock, Fred C. Philpitt, George Vande Sande, Charles F. Steininger and Robert R. Priddy

[57] ABSTRACT

A ship-borne sonar system includes a two-dimensional array of electromechanical transducers mounted on, or near, the focal surface of a concave spherical reflector to transmit and receive acoustic pulses in respective directions throughout a sideways sector of surveillance from the ship. A gating unit couples only some of the transducers to respective transmission-reception channels, the particular combination of transducers selected being controlled by a steering unit to stabilize or otherwise steer the transmission-reception direction within the surveillance-sector. Each detected echo is displayed with a directionality dependent upon which of the channels detected that echo.

7 Claims, 4 Drawing Figures

William Halliday
Roy William George-Haslett
Inventors

Hall, Pollock & Vande Sande
Attorneys

ECHO-RESPONSIVE APPARATUS

This invention is particularly concerned with sonar apparatus, that is to say, with apparatus in which there is response to echoes of acoustic wave energy (of frequency not necessarily within the audible-sound range) propagated in, for example, the sea.

According to the present invention sonar apparatus includes a concave spherical reflector, and a multiplicity of electromechanical transducers that are arranged adjacent to one another on, or near, the spherical focal surface of the reflector such that different transducers receive echoes reflected thereto from different directions throughout a sector of surveillance. A multiplicity of reception channels are arranged to be coupled to different ones of the transducers for detecting echoes received by these respective transducers, but there are fewer reception channels than transducers, and it is arranged that the particular combination of elements that are coupled to the reception channels is variable selectively. A display-representation of detected echoes is provided in accordance with whichever of the reception channels detect those individual echoes.

The sonar apparatus according to this invention is a development from the apparatus described in our U.S. Pat. No. 3,389,372 issued June 18, 1968. With this latter apparatus each electromechanical transducer is provided with an individual channel for the detection of echoes so that complete coverage of the sector under surveillance is provided in a static manner; with the apparatus of the present invention, fewer channels than electromechanical transducers are required so that in any particular case reduction in the number of reception channels required is enabled without affecting to any substantial extent coverage of the sector of surveillance. Appropriate variation of the combination of transducers that are coupled to the provided reception channels enables the whole, or any particular part, of the sector to be covered as desired. The combination of transducers selected for coupling to the individual reception channels may be varied in accordance with movement of a ship or other craft carrying the apparatus, so as to provide for stabilization of the display-representation. Alternatively, the combination may be varied in accordance with a steering command that, for example, is dependent upon manual control exerted by an operator of the apparatus.

The electromechanical transducers (for example, electrostrictive transducers of barium titanate) are preferably mounted as close as possible to one another on, or near, the focal surface of the reflector to receive echoes from very closely spaced angular directions throughout the sector of surveillance. The minimum angular spacing that can be obtained between the directions of reception is dependent to a substantial extent upon the closeness with which the transducers can be accommodated around the focal surface in this way. The size of each transducer is in this respect preferably chosen to be as small as usefully practicable with regard to the distribution in the focal surface of echo-energy received from the relevant direction by that transducer. The use of a small size enables a large number of transducers to be accommodated to cover any particular sector with a high degree of directional acuity.

The display-representation of detected echoes may be such that each echo is displayed in accordance with the range, as well as direction, from which it is received. Furthermore, the said further means providing the display-representation may comprise a display device and a switch for coupling the reception channels in turn to the display device. Alternatively the said further means may comprise a multiplicity of echo-indicating devices coupled to the reception channels respectively.

Sonar apparatus in accordance with the present invention will now be described, by way of example, with reference to the accompanying drawings, in which.

The sonar apparatus is for use on a ship to receive acoustic echoes from underwater 'targets.' The 'targets' may be fish or other underwater objects spaced from, or on, the bottom, and the bottom may in itself be a 'target.'

Figure 1:
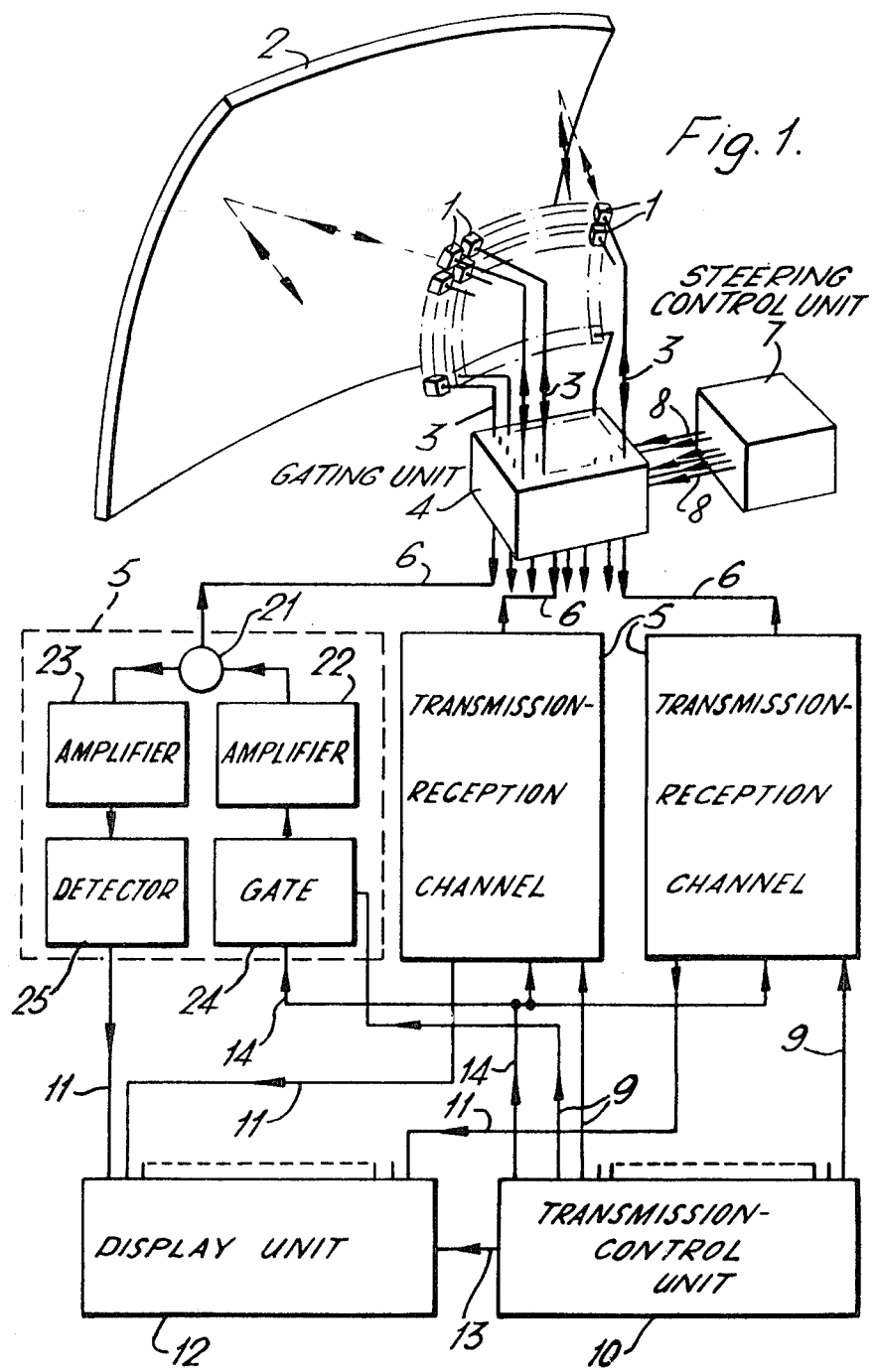
FIG. 1 is a schematic representation of the sonar apparatus, only one of a multiplicity of transmission-reception channels of the apparatus being shown in detail.

Referring to FIG. 1, 400 hundred identical electromechanical transducers 1 are mounted closely adjacent one another in a square array of 20 columns and 20 rows near the spherical focal surface of a spherical, concave reflector 2 of square aperture. The transducers 1, which are electrostrictive transducers, are connected via individual electrical paths 3 to a gating unit 4. Twenty transmission-reception channels 5 are connected to the gating unit 4 via individual electrical paths 6, and the unit 4 serves to interconnect the 20 paths 6 respectively with the paths 3 of a selected combination of 20 of the transducers 1. The particular combination of 20 transducers 1 that is selected for connection to the channels 5 in this way, depends upon control exerted by a steering-control unit 7. The unit 7 supplies gating signals to the unit 4 via electrical paths 8, and these signals are effective to determine which 20 paths 3 are connected to the paths 6 of the respective channels 5.

The transmission-reception channels 5 are each coupled via an individual electrical path 9 to a common transmission-control unit 10, and via an individual electrical path 11 to a common display unit 12, the two units 10 and 12 being interconnected via an electrical path 13. Electrical carrier-wave oscillations are supplied to the 20 channels 5 via a common electrical path 14 from the unit 10.

The array of transducers 1 and the reflector 2 are mounted externally of the hull of the ship below the water surface, the array being mounted with the columns of transducers 1 substantially upright and the rows substantially horizontal. Under control of the common transmission-control unit 10, the channels 5 supply pulses of the carrier-wave oscillations via the paths 6 to the gating unit 4 and thence to the selected 20 transducers 1 to cause them to emit into the water, and toward the reflector 2, corresponding pulses of acoustic oscillations. The reflector 2 is tilted forwards slightly towards the array of transducers 1 so that the acoustic pulses are reflected from the reflector 2 in a general downward direction from the ship.

Each transducer 1, since it is situated near the focal surface of the reflector 2, has from the reflector 2 an individual direction of transmission and, accordingly, of reception. Since the transducers 1 are closely positioned adjacent one another in two-dimensional array near the focal surface, their individual directions of transmission from the reflector 2 are closely spaced angularly with respect to one another in both azimuth and elevation. The 400 transducers 1 in combination with the reflector 2 are thereby capable of transmitting individual beams of acoustic energy that fan out from one another in different directions throughout a limited downwardly directed spherical sector centered on the ship ('spherical sector' in this context describes a volume of the form that is swept out by limited angular movement of a sector of a circle about an axis that lies in the plane of the circular sector and is normal to the radial-bisector of the sector). Only 20 of the 400 transducers 1 are at any one time supplied with the carrier oscillations, so there is transmission of acoustic energy within part only of this spherical sector, the particular beam-directions involved being dependent upon which combination of 20 transducers is selected by the gating unit 4. The gating signals supplied to the unit 4 by the steering-control unit 7 are such that the combination selected consists of 20 transducers 1 occupying adjacent positions in the array and thereby producing closely spaced beams of energy that fan out from one another through a single, discrete section of the spherical sector covered by the array.

In the present example the reflector 2 faces sideways from the ship and the unit 7 acts to select the transducers 1 in their horizontal rows of 20. The system accordingly acts to provide 20 closely spaced beams of acoustic energy fanning out from one another throughout the full azimuthal sector and inclined downwardly from the ship to an extent dependent upon which row is selected. The particular row of transducers 1 selected is varied in accordance with rolling movement of the ship such that the downward inclination of the sector of transmission is maintained substantially constant relative to the horizontal. The unit 7 in this respect includes a vertical-reference device (not shown, but for example a gyroscope or pendulum), and it is from the measure of roll-angle provided by such device that the gating signals necessary to achieve this stabilization are derived.

If any part of the transmitted energy is reflected back as an echo within the sector of transmission, then this returns via the reflector 2 to be received by one or other of the transducers 1, the particular one being dependent upon the direction from which the echo is received. Echoes received in this way by the selected transducers 1 generate therein electrical signals that are passed to the individually associated channels 5 via the paths 3, the gating unit 4 and the paths 6. Each echo-signal after amplification and detection in the respective channel 5 is passed via the relevant path 11 for display by the display unit 12. Synchronization of the time-base of the display with the transmission of the acoustic pulses is achieved by means of an electric signal supplied to the unit 12 via the path 13 and synchronized in its timing with the supply of pulses from the channels 5 to the selected transducers 1. The use of the separate channels 5 in the reception of the echo signals ensures that the directional information relating to each echo is preserved, the directional acuity being dependent upon the width of beam originating from each transducer 1 via the reflector 2, and also upon the number of transducers 1 (and thereby the number of separate beams used) for the sector covered. In the present example, each beam has a half-power width of 1° in both elevation and azimuth, the individual directions of transmission for the 20 transducers 1 of each row being distributed uniformly throughout a sector of 20°. The wavelength of the acoustic energy in water is in this case 0.6 centimeter and the reflector 2 has a focal length of 50 centimeters with the sides of its square aperture each 30.6 centimeters in length. (The width of the beam in degrees and measured in the plane of either aperture-dimension is in the present case approximately 51λ/X where λ is the wavelength and X the relevant aperture-dimension.) Each transducer 1 is substantially square having sides, measured parallel to the sides of the square aperture, of 0.88 centimeter.

The side-dimension of each transducer 1 is chosen to be as small as possible consistent with efficient operation, in order that a larger number of transducers 1 can be accommodated in each row on, or near, the focal surface (to produce a correspondingly large number of beams within the sector of transmission, and thereby ensure a high degree of acuity), and so that a large number of rows can be correspondingly accommodated within the angular range throughout which roll-stabilization is required. In this respect, the side-dimension is chosen by reference to the distribution of energy that obtains on the focal surface of a concave spherical reflector of circular aperture and illuminated with acoustic energy from infinity. To a large extent the energy received in the latter case is concentrated in a central circular region of the distribution pattern, the radius R of this circular region, the Airy disc, being related to the focal length F and the diameter D of the aperture, and to the wavelength λ, by the formula:

$$R = 1.22\ F\lambda/D$$

With the specific values of focal length 50 centimeters) and wavelength (0.6 centimeter) quoted above in relation to FIG. 1, a reflector having a circular aperture of diameter 30.6 centimeters would give rise to an Airy disc having a radius of 1.2 centimeter. A substantial part of the energy distributed within the Airy disc is concentrated in the central area bounded by a circle of half this radius, so that useful reception of the energy can accordingly be made by a transducer extending across this central area alone, that is to say, over 1.2 centimeter. By analogy, useful reception of energy from the spherical reflector 2 of square aperture, is achieved over a square area of side-dimension 0.88 centimeter in the focal surface, that is to say, over the operative area chosen for each transducer 1. The transducers 1 in each row, and in each column, are positioned adjacent to one another along an arc of the focal surface extending through 20° at a radius of 50 centimeters; with a side-dimension of 0.88 centimeter each, 20 transducers 1 can accordingly be readily accommodated along such arc, so as to give efficient individual coverage of 20 angularly spaced directions within the sector of 20°. With the transducers 1 located actually on the focal surface the system is focused at infinity, and so in order to provide focused coverage of nearer regions it is necessary to locate them with a slight displacement (for example, up to 5 centimeters) from the focal surface in the direction towards the center of curvature of the reflector 2.

Considering the apparatus of FIG. 1 in greater detail, each transmission-reception channel 5 includes a transmit-receive switch 21, and it is to this switch 21 that the path 6 interconnecting the channel 5 with the gating unit 4 is coupled. A transmitter-amplifier 22 and a receiver-amplifier 23 are both connected to the switch 21 within the channel 5, the switch 21 serving to isolate the amplifier 23 from the pulsed carrier-wave signals that are supplied by the amplifier 22 for transmission to the unit 4 via the path 6, and also to isolate the amplifier 22 from the path 6 while echo-signals are being passed from the unit 4 to the channel 5. The pulsed carrier-wave signals are supplied through the amplifier 22 from a gate 24, the gate 24 receiving from the common transmission-control unit 10 the signals supplied to the channel 5 via the paths 9 and 14. The unit 10, as well as supplying the carrier-wave oscillations to the path 14, supplies a train of gating pulses to the path 9, and the pulses of this train control operation of the gate 24 to pass from the path 14 to the amplifier 22 corresponding pulses of the carrier-wave oscillations. The carrier-wave oscillations in the present example have a frequency of 250 kilocycles per second, and each pulse of oscillations has a duration of 30 microseconds.

During the intervals between successive pulses supplied to the path 6 via the amplifier 22 and the switch 21, echo-signals passed via the path 6 to the channel 5 are passed through the switch 21 to the amplifier 23. The amplifier 23, which has automatic gain-control, amplifies each echo-signal and passes this to a detector 25, the resultant, detected signal being supplied from the channel 5 to the common display unit 12 via the relevant path 11.

The display unit 12 provides, in accordance with the signals it receives via the 20 paths 11, a roll-stabilized display indicating both the direction and range from which echoes are received by the apparatus. Signals representing echoes received from different bearings are received by the unit 12 via different ones of the path 11, the particular path 11 involved in each case signifying the relevant direction. The timing of the received echo in relation to the transmitted pulse provides, in the conventional manner, a measure of the range from which the echo is received. The actual construction of the display unit 12 is not of primary importance, but it can conveniently be as shown in FIG. 2.

Figure 2:
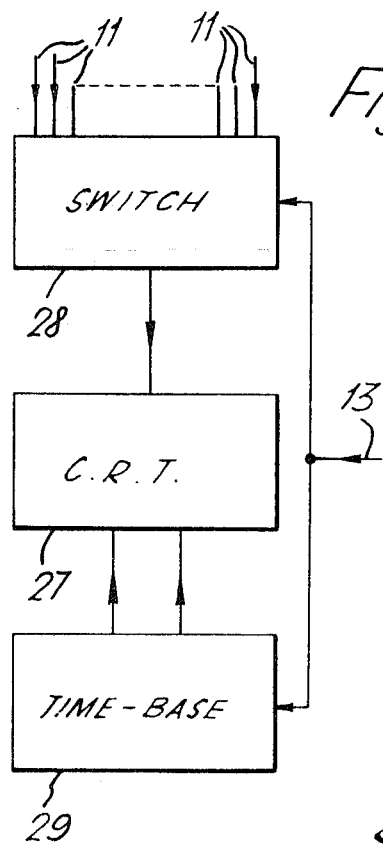
FIG. 2 is a block schematic representation of a display unit of the sonar apparatus shown in FIG. 1.

Referring to FIG. 2, the display is provided by a cathode-ray tube unit 27 that is connected to the paths 11 one at a time and in turn by an electronic switch 28. The switch 28 receives, in common with a time-base unit 29, the synchronization signal supplied via the path 13 from the common transmission-control unit 10, and this serves to synchronize the stepping sequence of the switch 28 to the time-base of the display. The time-base unit 29 supplies to the unit 27 time-base waveforms appropriate to the representation in Cartesian coordinates of range against bearing, that is to say, appropriate to a Type B display. In this display, the echoes are indicated by intensity modulation of the cathode-ray trace, all the paths 11 being connected to the time-shared unit 27 in turn as the trace is swept progressively across the bearing-axis of the display. The full sweep of the trace, and hence the sampling of all 20 paths 11, takes place within the duration of a transmitted pulse, that is to say, all within 30 microseconds.

Where, from a practical standpoint it is desired to avoid the need for a sampling switch such as the switch 28, a form of display unit 12 not involving time-sharing may be used. Alternative forms of the unit 12 not involving time-sharing are illustrated in FIGS. 3 and 4.

Figure 3:
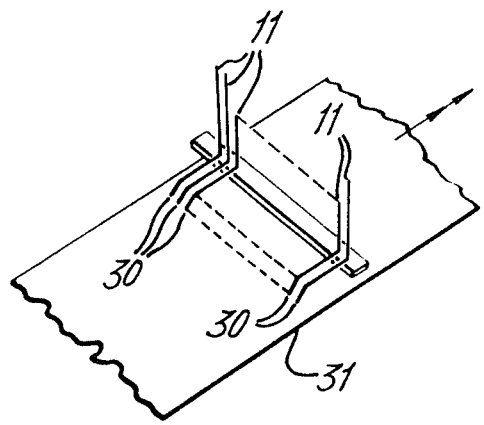
FIG. 3 illustrates an alternative form of the display unit.

Referring to FIG. 3, the 20 paths 11 are connected respectively to 20 recording pens 30 that are carried together, but spaced from one another, across the width of a recording paper 31. The paper 31 moves slowly lengthwise under the pens 30 and is marked by them in accordance with the echo-signals received, the particular position in each case being indicative, by its distance across and along the paper 31 respectively, of the bearing and range from which the relevant echo is received. It may be arranged that the same length of paper 31 moves under the pens 30 during repeated recording sequences so that the representations of corresponding echoes received during the successive sequences are correlated with one another in the record.

Figure 4:
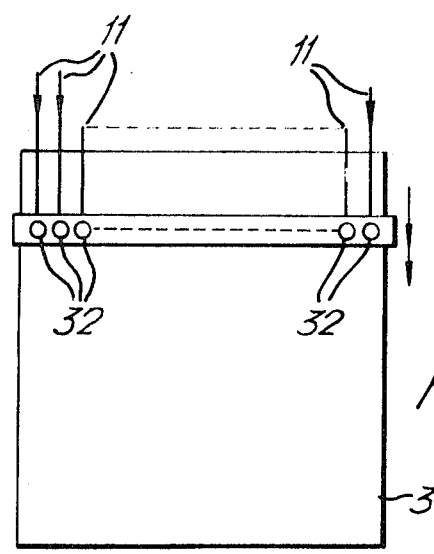
FIG. 4 illustrates a further alternative form of the display unit.

Referring to FIG. 4, the 20 paths 11 are in this case connected respectively to 20 indicator lamps 32. The lamps 32 (which may be, for example, neon or gallium-arsenide lamps) are carried together, but spaced apart from one another, across the width of a rectangular display area 33. The lamps 32 are moved together from one end to the other along the length (the range-dimension) of the area 33, the lamps 32 emitting light in response to signals supplied from the paths 11. The position across the width of the area 33 and along its length at which light is emitted, indicates the bearing and range respectively, from which an echo is received. The assembly of lamps 32 is returned rapidly to its starting position following each sweep lengthwise (through the range-dimension) of the area 33.

The apparatus described above with reference to FIG. 1 can be provided simply and economically, the need to provide the multiplicity of separate transmission-reception channels 5 being readily met using, for example, techniques involving printed-circuit construction. Clearly, the channels 5 could be simplified by arranging that the function of each is limited to reception, transmission being carried out by means of a unit common to all the selected 20 transducers 1, or indeed to all 400 transducers. Separate transducers for transmission and reception could be used, transmission being made, for example, by a transducer not associated with the reflector 2.

With the separate transmission-reception channels 5, the transmission of pulses from the different transducers 1 of the selected combination, may be effected concurrently or sequentially, and may also be made conveniently using different carrier frequencies as between these transducers 1. (In the latter connection it is necessary simply to arrange that different frequencies are used between adjacent pairs, or larger-groupings, of transducers 1.) The use of different carrier frequencies in this manner can be of practical importance in distinguishing between echoes received from the regions where side-lobes of adjacent transducers 1 overlap one another. To the same end, the carriers may be modulated in frequency by random-noise signals, different modulating signals being used for discrimination purposes as between adjacent transducers. The side-lobes of the beam produced by the transducers 1 and reflector 2 in cooperation, could be reduced by shaping the reflector 2.

With the sonar apparatus of FIG. 1, the steering-control unit 7 is described as selecting one or other of the rows of transducers 1 in dependence upon rolling movement of the ship, but it is of course possible for the unit 7 to make selection on the basis of other groupings of the transducers 1. In particular the unit 7 may equally well be arranged to make selection of one or other of the columns of transducers 1 in dependence, for example, upon yawing movement of the ship so as to provide a yaw-stabilized display. Clearly, selection need not be confined to the linear groupings of row or column, and in this respect the combination of 20 transducers 1 may be selected as a two-dimensional array, for example a 5 × 4 array made up by selection of the transducers 1 that in any identified group of four consecutive rows lie in any identified group of five consecutive columns. The identification of the appropriate groups of consecutive rows and columns may be made within the unit 7 in accordance with rolling pitching or yawing movement of the ship, or any combination of these, so as to provide an appropriately stabilized display. This identification, as with the control of selection performed by the unit 7 in other circumstances, may clearly be carried out in accordance with a beam-steering command derived independently of movement of the ship; the command may, for example be derived simply in accordance with manual control exerted by an operator. In these latter circumstances it will probably be necessary to convey the command to the display unit 12 as well, in order that the display provided may be appropriately modified in accordance with the beam-steering effected.

In the circumstances where the unit 7 acts to select a two-dimensional array of the transducers 1, the echo-signals derived by the separate channels 5 may be used to provide a two-dimensional display 'picture' of the water at a selected range, targets in the plane normal to the transmitted beams at this range being represented in the display at positions corresponding to the positions in the plane. The acoustic signals transmitted in this case may be continuous-wave (CW) instead of pulsed, and correspondingly the echoes received will then be substantially continuous; it may be necessary in this case to increase the frequency of transmission in order to maintain the desired degree of acuity. The selection of range is effected by appropriate time-gating of the received echo-signals, and it may be arranged, simply by varying the timing of the gated-interval progressively with respect to the synchronizing signal on the path 13, that the display presents a cross-sectional view at a progressively changing range, of the volume of water under surveillance. Furthermore, by using differential delay between the gating-intervals of the different channels 5 it is possible to present 'pictures' from planes inclined out of the normal to the transmitted beams.

Display techniques involving stereoscopic effects, real or simulated, may be employed with the apparatus. As a simple example, the echo-signals from the different channels 5 may be supplied (as with the arrangement of FIG. 4) to separate indicating lamps that are moved apart from one another, or by some optical means are made to appear to move apart from one another, to simulate changing range, and in these circumstances a stereoscopic view of the volume of water under surveillance may be achieved using binocular viewing of the resulting display.

Additionally, by providing for adjustment of the displacement of the array of transducers 1 with respect to the focal surface of the reflector 2, the range at which targets are in focus can be selectively adjusted. By suitable choice of the parameters of the array and reflector 2, a small depth of field can be obtained, targets within focus being presented for display with partial elimination of targets out of focus. A stop, positioned at the center of curvature of the reflector 2, may be used to limit the exit- and entry-angle of acoustic energy with respect to the reflector 2, and thereby ensure uniform acoustic illumination across the effective aperture of the system.

We claim:

1. Sonar apparatus comprising: a concave spherical reflector having a spherical focal surface; a multiplicity of electromechanical transducers mounted close to one another around said focal surface for receiving via the reflector acoustic echoes from a multiplicity of closely spaced angular directions throughout a sector of surveillance, different ones of said transducers receiving echoes as aforesaid from different ones of said directions; a multiplicity of reception channels adapted to be coupled to said transducers for detecting echoes received thereby, there being fewer reception channels than transducers; selector means for coupling said reception channels to respective ones of a selected combination of said transducers to detect the echoes received thereby, the particular combination of transducers involved being variable selectively; and further means for providing a display-representation of echoes detected by said reception channels, said further means providing representation of direction of reception of each such echo in accordance with whichever of the reception channels detects that echo.

2. Sonar apparatus according to claim 1 wherein said further means is means for displaying detected echoes each in accordance with the direction and range from which that individual echo is received.

3. Sonar apparatus according to claim 1 wherein said further means comprises a display device and a switch for coupling the reception channels in turn to the display device to receive from the reception channels sequentially signals in accordance with echoes detected by the different reception channels.

4. Sonar apparatus according to claim 1 wherein said further means comprises a multiplicity of echo-indicating devices to indicate echoes detected by the different channels of said combination.

5. Sonar apparatus according to claim 1 for use on a craft and including an attitude-responsive device for controlling in accordance with craft-attitude the selection made by said selector means.

6. Sonar apparatus according to claim 1 including a multiplicity of separate transmission channels for supplying electric carrier-wave oscillations to the transducers, said selector means coupling the transmission channels to respective ones of the said combination of transducers to supply carrier-wave oscillations thereto individually, and each said transducer being responsive to the supply of said carrier-wave oscillations thereto to emit corresponding acoustic energy.

7. Sonar apparatus according to claim 6 wherein said carrier-wave oscillations are pulsed oscillations, each said transducer emitting pulses of acoustic energy alternately with the reception of echoes.

* * * * *